(12) United States Patent
King, Jr.

(10) Patent No.: US 10,363,443 B2
(45) Date of Patent: Jul. 30, 2019

(54) PASSIVE DUCTWORK INTUMESCENT FIRE DAMPER

(71) Applicant: Jack F. King, Jr., North Kingstown, RI (US)

(72) Inventor: Jack F. King, Jr., North Kingstown, RI (US)

(73) Assignee: Superposed Associates LLC, North Kingstown, RI (US)

( * ) Notice: Subject to any disclaimer, the term of this patent is extended or adjusted under 35 U.S.C. 154(b) by 0 days.

(21) Appl. No.: 15/636,954

(22) Filed: Jun. 29, 2017

(65) Prior Publication Data
US 2018/0001122 A1   Jan. 4, 2018

Related U.S. Application Data

(60) Provisional application No. 62/357,211, filed on Jun. 30, 2016.

(51) Int. Cl.
A62C 2/06   (2006.01)
A62C 3/00   (2006.01)
F24F 11/35  (2018.01)
E04B 1/94   (2006.01)
F16L 5/04   (2006.01)
F24F 13/08  (2006.01)
F24F 13/02  (2006.01)

(52) U.S. Cl.
CPC .............. A62C 2/065 (2013.01); E04B 1/947 (2013.01); F16L 5/04 (2013.01); F24F 13/0263 (2013.01); F24F 13/08 (2013.01); A62C 2/06 (2013.01); A62C 3/006 (2013.01); F24F 11/35 (2018.01); F24F 2221/30 (2013.01)

(58) Field of Classification Search
CPC ......... E04B 1/947; E04B 1/948; A62C 2/065; A62C 3/0214; A62C 3/006; F24F 11/35
See application file for complete search history.

(56) References Cited

U.S. PATENT DOCUMENTS

| 3,884,307 | A | * | 5/1975 | Williams | A62C 35/10 169/28 |
| 4,136,707 | A | * | 1/1979 | Gaillot | A62C 2/065 137/360 |
| 4,559,745 | A | | 12/1985 | Wexler | |
| 4,796,401 | A | | 1/1989 | Wexler | |
| 4,848,043 | A | | 7/1989 | Harbeke | |
| 4,882,886 | A | | 11/1989 | Harbeke | |
| 4,894,966 | A | | 1/1990 | Bailey et al. | |
| 4,901,488 | A | | 2/1990 | Murota et al. | |
| 4,951,442 | A | | 8/1990 | Harbeke, Jr. | |
| 5,129,201 | A | | 7/1992 | Robertson et al. | |

(Continued)

FOREIGN PATENT DOCUMENTS

DE    19956066 A1    8/2000
DE    102006026190 A1    11/2007

(Continued)

Primary Examiner — Christine T Cajilig
(74) Attorney, Agent, or Firm — Breiner & Breiner, L.L.C.

(57) ABSTRACT

A passive ductwork intumescent fire damper is disclosed having a sheet metal box; an intumescent; a sheet metal comb; a plastic liner; a sheet metal comb catch; and a sheet metal escutcheon. The fire damper is particularly useful in a structural wall ducted horizontally such as a side wall range hood installation.

15 Claims, 12 Drawing Sheets

(56) References Cited

U.S. PATENT DOCUMENTS

| | | |
|---|---|---|
| 5,155,957 A | 10/1992 | Robertson et al. |
| 5,257,641 A * | 11/1993 | Elsbury .................. A62C 2/065 137/79 |
| 5,309,688 A | 5/1994 | Robertson |
| 5,331,946 A * | 7/1994 | Yamini .................... A62C 2/06 126/314 |
| 5,345,677 A | 9/1994 | Cook, Sr. |
| 5,347,767 A | 9/1994 | Roth |
| 5,421,127 A | 6/1995 | Stefely |
| 5,452,551 A | 9/1995 | Charland et al. |
| 5,456,050 A | 10/1995 | Ward |
| 5,634,304 A | 6/1997 | Sakno |
| 5,876,042 A | 3/1999 | Graf et al. |
| 5,887,395 A | 3/1999 | Navarro et al. |
| 5,953,872 A | 9/1999 | MacMillian et al. |
| 5,970,670 A | 10/1999 | Hoffman |
| 6,029,412 A | 2/2000 | Gohlke |
| 6,161,873 A | 12/2000 | Munzenberger et al. |
| 6,176,052 B1 | 1/2001 | Takahashi |
| 6,360,502 B1 | 3/2002 | Stahl, Jr. |
| 6,405,502 B1 | 6/2002 | Cornwall |
| 6,426,463 B2 | 7/2002 | Munzenberger et al. |
| 6,615,860 B2 | 9/2003 | Didone et al. |
| 6,694,684 B2 | 2/2004 | Radke et al. |
| 6,725,615 B1 | 4/2004 | Porter |
| 7,080,486 B2 | 7/2006 | Radke et al. |
| 7,523,590 B2 * | 4/2009 | Stahl, Sr. ................ A62C 2/065 52/220.8 |
| 7,596,914 B2 | 10/2009 | Stahl, Sr. et al. |
| 7,642,461 B2 * | 1/2010 | Klein ....................... F16L 5/04 174/93 |
| 7,784,221 B2 * | 8/2010 | Truss ...................... A62C 2/065 137/75 |
| 7,877,941 B2 | 2/2011 | Fischer et al. |
| 7,913,468 B2 | 3/2011 | Spais |
| 8,001,737 B1 * | 8/2011 | Price ....................... F16L 5/10 248/346.5 |
| 8,029,345 B2 * | 10/2011 | Messmer ................ A62C 2/065 454/284 |
| 8,178,781 B2 | 5/2012 | Duffy |
| 8,188,382 B2 * | 5/2012 | Monden ................. E04G 15/061 174/505 |
| 8,689,504 B2 | 4/2014 | Monden et al. |
| 8,739,482 B1 * | 6/2014 | Feil, III ................. A62C 2/065 52/220.8 |
| 9,089,726 B1 * | 7/2015 | Luo ........................ A62C 2/065 |
| 9,103,116 B2 * | 8/2015 | McConnell ............... E04B 5/48 |
| 2004/0211138 A1 | 10/2004 | Sakno |
| 2005/0150677 A1 | 7/2005 | Hochstim et al. |
| 2006/0096207 A1 | 5/2006 | Spais |
| 2006/0117677 A1 * | 6/2006 | Muenzenberger ........ F16L 5/04 52/100 |
| 2007/0257487 A1 | 11/2007 | Jacklich et al. |
| 2008/0248739 A1 * | 10/2008 | Carlson ..................... A62C 2/12 454/369 |
| 2009/0255619 A1 | 10/2009 | Tong |
| 2012/0186684 A1 | 7/2012 | Giovannetti et al. |
| 2013/0091789 A1 | 4/2013 | Simon et al. |
| 2013/0186020 A1 * | 7/2013 | Pilz ....................... E04B 2/7411 52/232 |
| 2014/0007373 A1 | 1/2014 | Muenzenberger |
| 2014/0077043 A1 | 3/2014 | Foerg |
| 2014/0082956 A1 | 3/2014 | Sullivan |
| 2014/0260016 A1 | 9/2014 | Langille et al. |
| 2015/0121782 A1 | 5/2015 | McConnell et al. |
| 2015/0121783 A1 | 5/2015 | McConnell et al. |
| 2015/0204087 A1 | 7/2015 | Muenzenberger |
| 2016/0146411 A1 * | 5/2016 | Luo ........................ F21S 8/026 362/364 |

FOREIGN PATENT DOCUMENTS

| | | | |
|---|---|---|---|
| DE | 102011009437 A1 * | 7/2012 | ............ A62C 2/065 |
| DE | 102012216562 A1 | 10/2013 | |
| EP | 2239014 A1 | 3/2010 | |
| EP | 2412409 A1 | 7/2011 | |
| FR | 2363673 A1 | 3/1978 | |
| FR | 2370139 A2 | 6/1978 | |
| GB | 2419385 B | 1/2010 | |
| WO | 9918303 A1 | 4/1999 | |
| WO | 2007068787 A1 | 6/2007 | |
| WO | 2008056029 A1 | 5/2008 | |
| WO | 2010112851 A2 | 10/2010 | |
| WO | 2016191373 A1 | 12/2016 | |

* cited by examiner

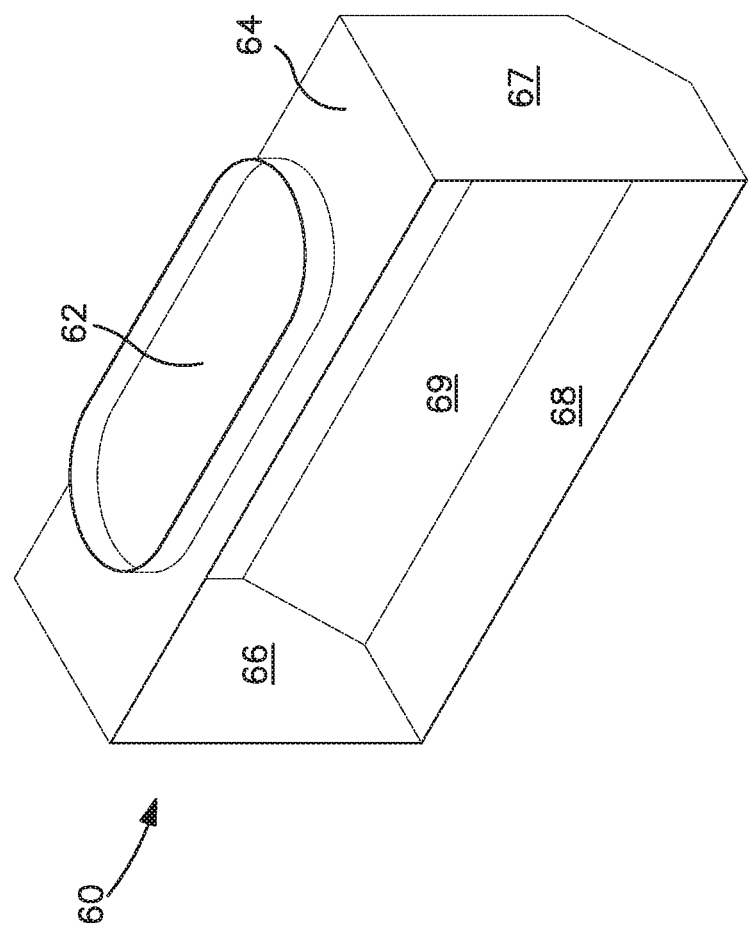
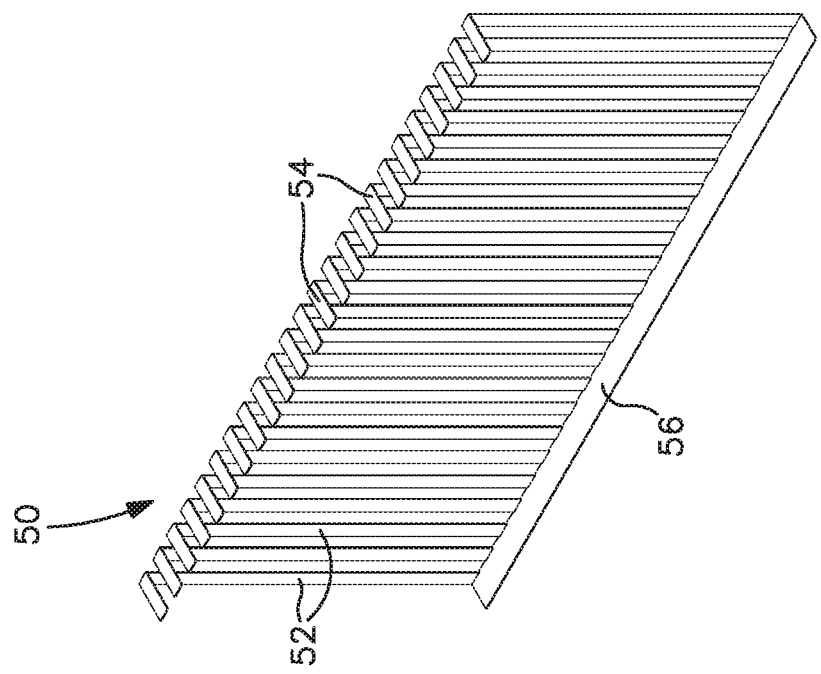
FIG. 8
FIG. 7

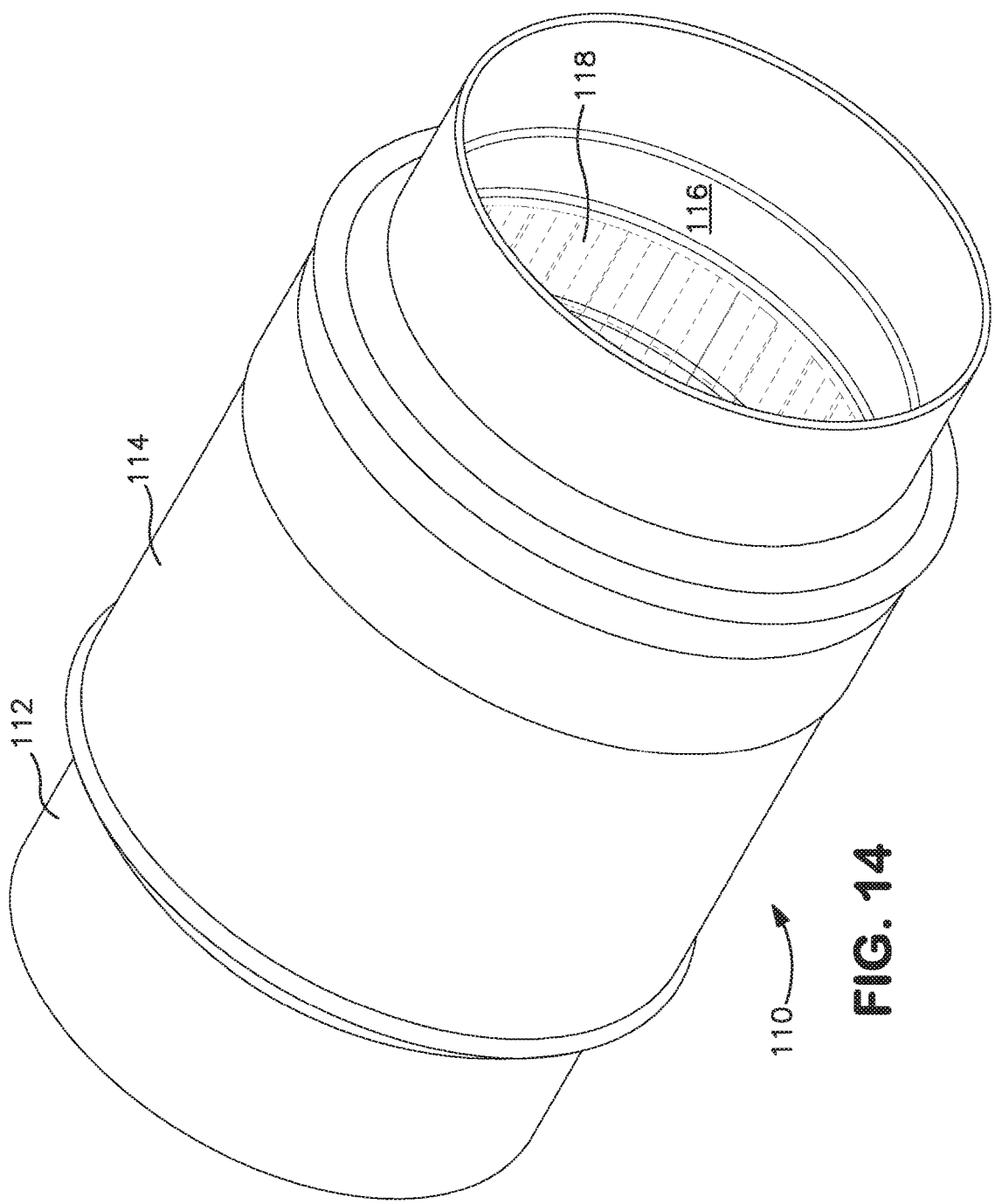

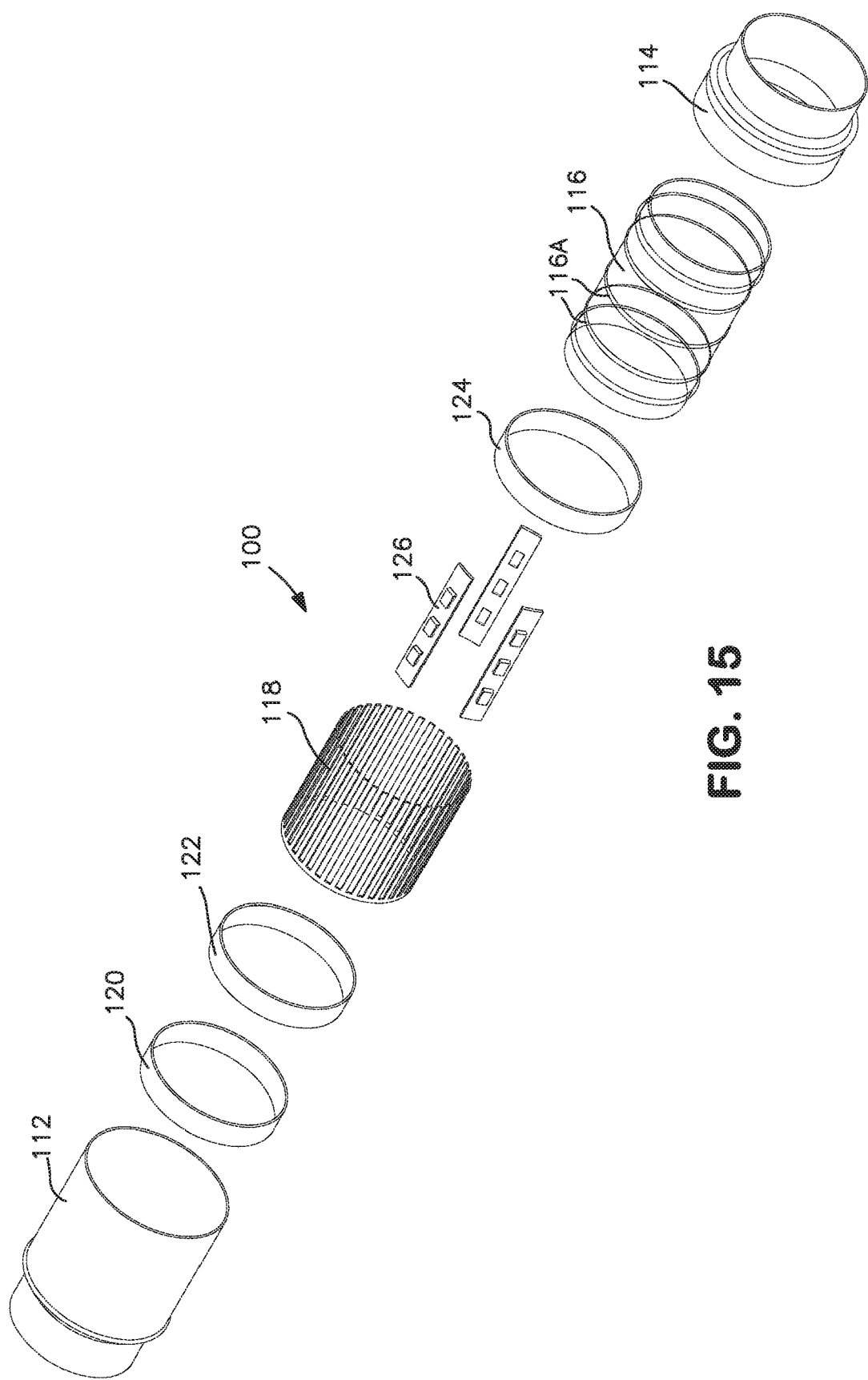

PASSIVE DUCTWORK INTUMESCENT FIRE DAMPER

RELATED APPLICATION

This application claims benefit of U.S. Provisional Application Ser. No. 62/357,211, filed Jun. 30, 2016, entitled "Passive Ductwork Intumescent Fire Damper," which application is incorporated herein by reference in its entirety.

FIELD OF THE INVENTION

The present invention relates to a passive ductwork intumescent fire damper. More particularly, the invention relates to a fire damper for use in a structural wall ducted horizontally such as a side wall range hood installation.

BACKGROUND OF THE INVENTION

Fire dampers are known in the art. For example, fire dampers and ceiling radiation dampers (collectively and broadly referred herein to as "fire damper") which are "dynamic" and "standard" are known and require periodic testing according to some code requirements to ensure their proper operation. In some applications, these dampers cannot be used due to products or byproducts in the air stream which will cause build up and create a hazard of blockage or possibly negatively impair the proper operation of the damper. When these fire dampers are concealed within a fire rated assembly, access is required to the damper requiring a fire rated access door. Such dampers are usually not suitable for use in small ductwork including kitchen exhaust, dryer exhaust, bathroom ventilation and any other ductwork which may require material collection such as in a shop having substantial dust of material build up.

Additionally, fire dampers using a fusible link are known in the art. For example, Aire Technologies Inc. makes a fire damper "Series 65 Type B Static Fire Damper" which includes a rectangular frame having a top enclosure having blades riveted to the frame and held in place by a fusible link which will release the blades to cut off circulation in the duct upon reaching a certain temperature. Such devices while useful for certain applications are complex, expensive and do not readily lend themselves to use in ductwork of smaller applications such as a kitchen exhaust, dryer exhaust or the like.

Additionally, fire dampers using an intumescent are known in the art. However, these fire dampers are complex and expensive to manufacture.

These devices while useful in certain situations have various shortcomings including their complex nature, their expense to manufacture and their inability to work well in small ductwork or ventilation systems. These and other shortcomings of such devices are addressed by the present invention.

SUMMARY OF THE INVENTION

A primary object of the present invention is to provide a passive intumescent fire damper with a simple and flexible design and useful in small ductwork and ventilation applications.

Another primary object of the present invention is to provide a passive intumescent fire damper for a structural wall ducted horizontally.

Another primary object of the present invention is to provide a passive ductwork intumescent fire damper simple in construction, inexpensive and easy to install and use.

The passive ductwork intumescent fire damper invention may comprise a sheet metal box; a ceramic sheet lining; an L-shaped intumescent; a sheet metal comb; a plastic liner; a sheet metal comb catch; and a sheet metal escutcheon. The fire damper is particularly useful in a structural wall ducted horizontally such as a side wall range hood installation.

In another embodiment, the passive ductwork intumescent fire damper invention may comprise a sheet metal box; an intumescent; a sheet metal comb; a plastic liner; a sheet metal comb catch; and a sheet metal escutcheon.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 7 is an enlarged view of the sheet metal comb shown in FIGS. 2 and 3.

FIG. 8 is an enlarged view of the plastic liner shown in FIGS. 2 and 3.

FIG. 14 is a passive intumescent fire damper.

FIG. 15 is an exploded view of the passive intumescent fire damper of FIG. 14.

DETAILED DESCRIPTION OF THE PREFERRED EMBODIMENTS

Figure 1:
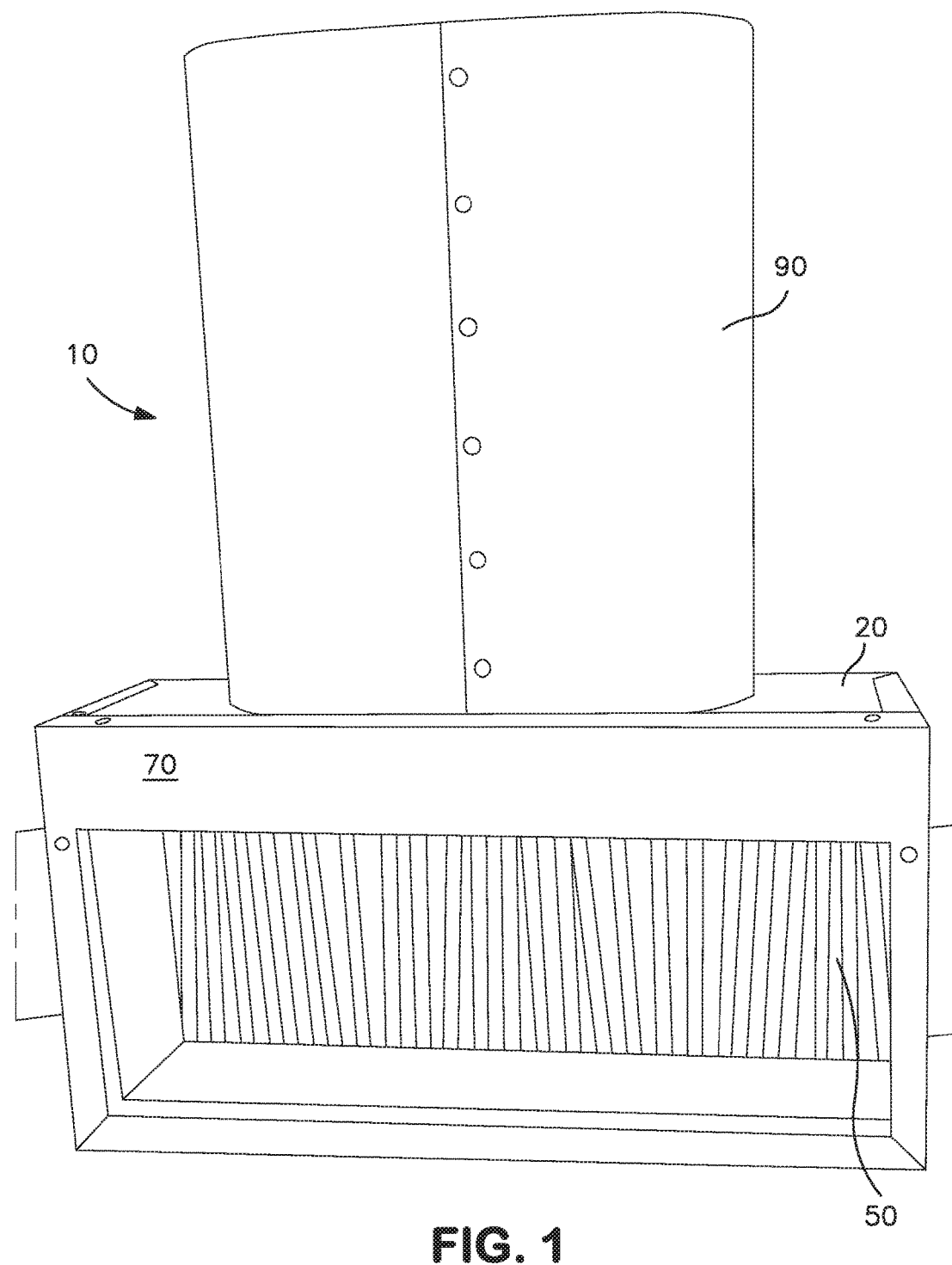
FIG. 1 is a front perspective view of the assembled fire damper of the present invention.
Figure 2:
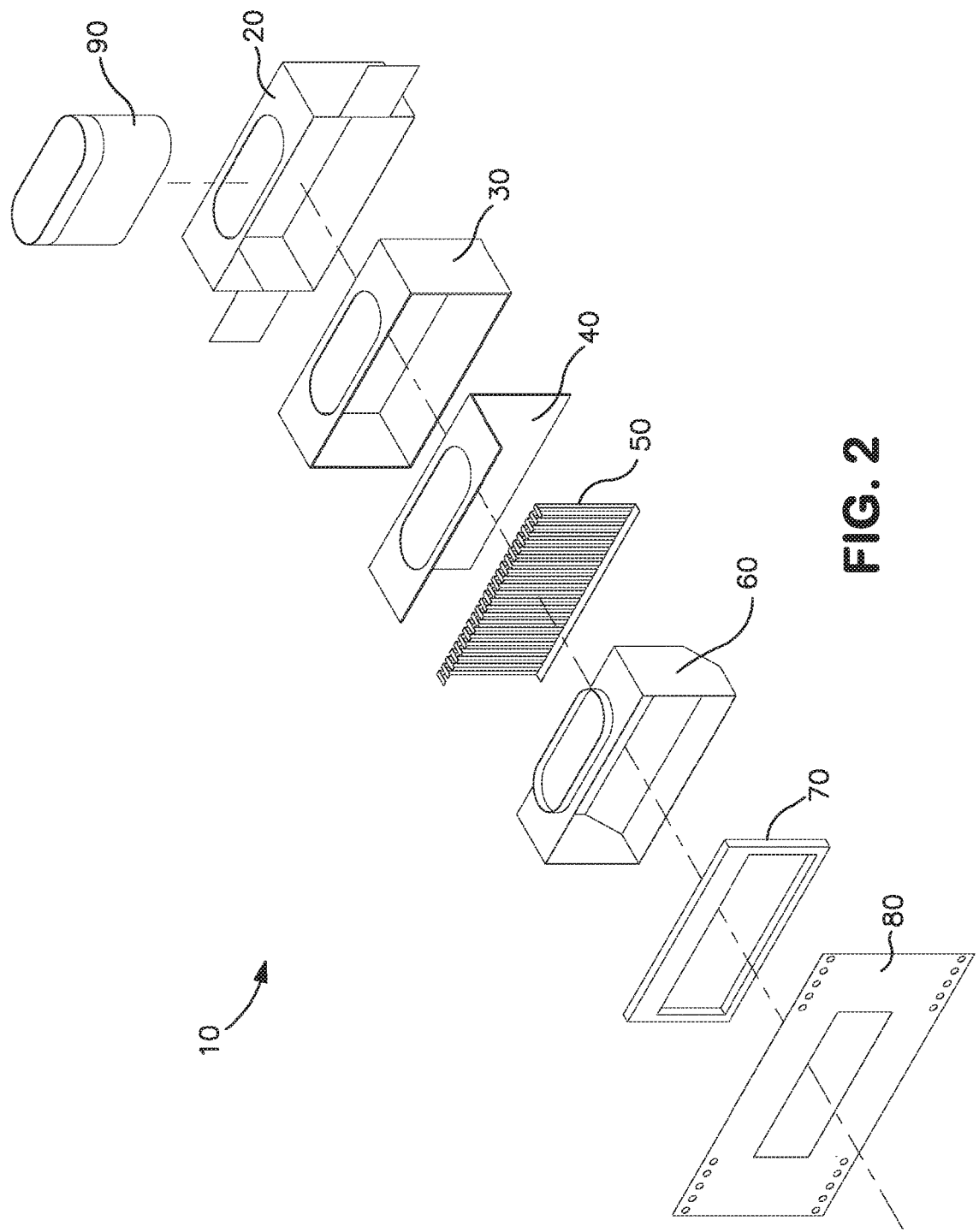
FIG. 2 is an exploded view of the fire damper components of FIG. 1.
Figure 3:
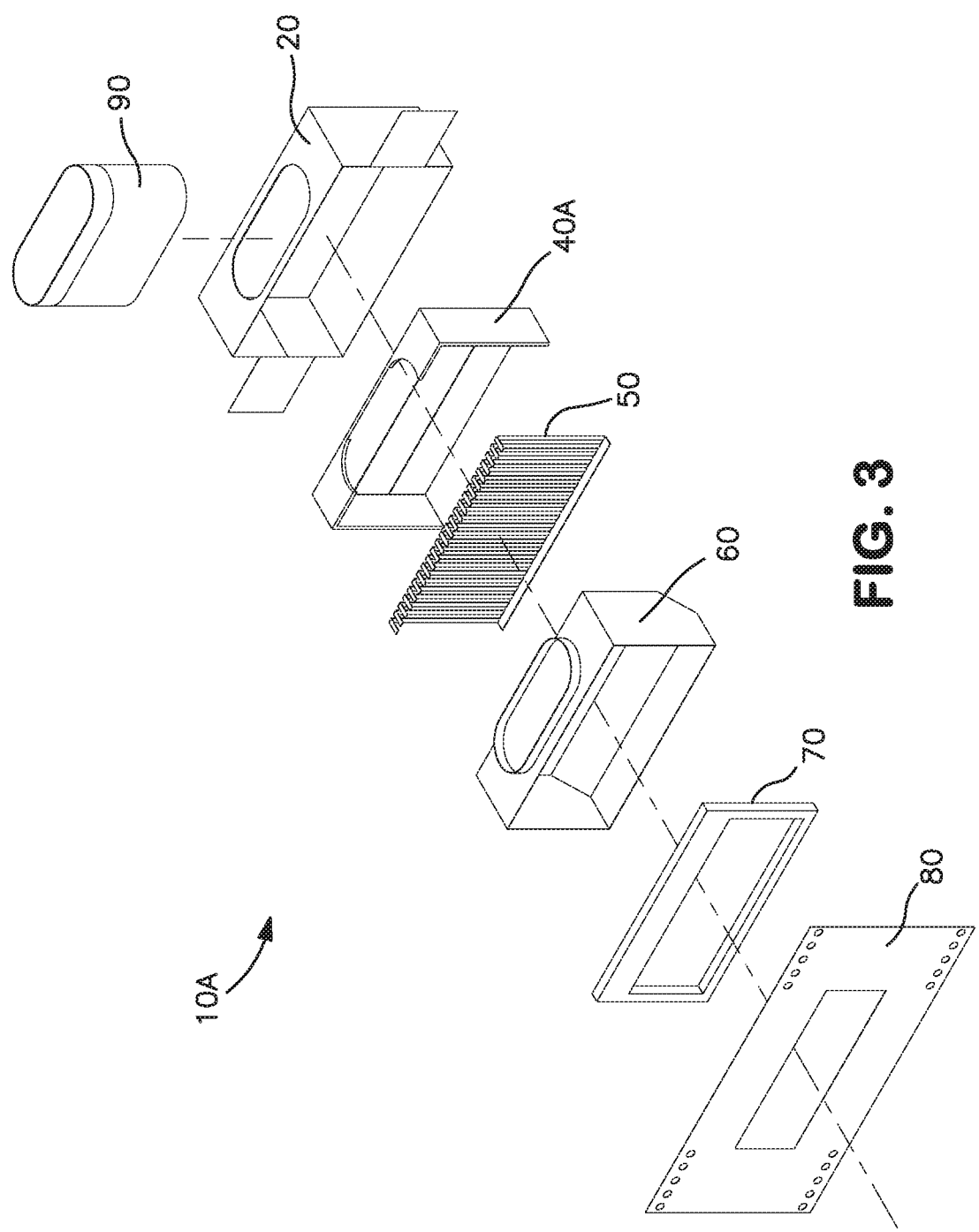
FIG. 3 is an exploded view of an alternative embodiment of the fire damper of FIG. 1.

The passive ductwork intumescent fire damper invention is illustrated in FIGS. 1-13. There are two embodiments disclosed as seen, for example, in FIGS. 2 and 3. The embodiments are similar except that the embodiment in FIG. 3 does not use a ceramic lining and the shape of the intumescent in FIGS. 2 and 3 are different. Otherwise, the embodiments of FIGS. 2 and 3 are substantially the same.

As best seen, for example, in FIG. 2, a fire damper 10 comprises a sheet metal box 20; a ceramic sheet lining 30; an L-shaped intumescent 40; a sheet metal comb 50; a plastic liner 60; a sheet metal comb catch 70; and a sheet metal escutcheon 80. Attached to the fire damper is a sheet metal male sleeve 90 which fits into the sheet metal box 20 and is connected to a duct (not shown). The fire damper 10 shown for purposes of illustration is rectangular. However, it is understood that the invention is useful with other shape fire dampers. It is further understood that the other components of the fire damper may vary in shape and materials. Additionally, the fire damper 10 may be surrounded or wrapped in an insulating material such as a rock wool material.

As noted above, FIG. 3 illustrates a fire damper 10A substantially similar to the fire damper 10 of FIG. 2 except that it does not use the ceramic lining 30 and the shape of the intumescent is different. The fire damper 10A comprises a sheet metal box 20; an intumescent 40A; a sheet metal comb 50; a plastic liner 60; a sheet metal comb catch 70; and a sheet metal escutcheon 80. Attached to the fire damper is a sheet metal male sleeve 90 which fits into the sheet metal box 20 and is connected to a duct (not shown). The fire damper 10A shown for purposes of illustration is rectangular. However, it is understood that the invention is useful with other shape fire dampers. It is further understood that the other components of the fire damper may vary in shape and materials.

Figure 4:
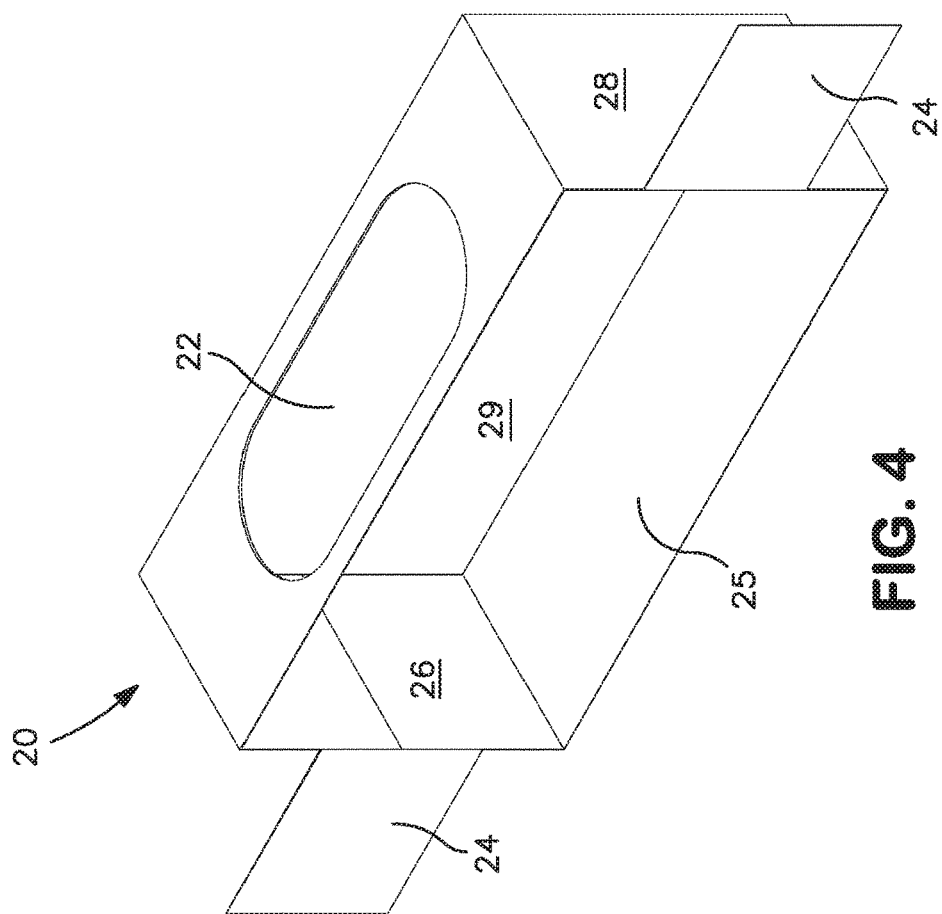
FIG. 4 is an enlarged view of the sheet metal box shown in FIGS. 2 and 3.

The various components of the invention will now be discussed in greater detail. Referring, for example, to FIG. 4, the sheet metal box 20 generally is rectangular and has an opening 22 for receiving the male sleeve 90 which provides for exhaust from, for example, a kitchen range. Box 20 includes a connection means 24 for attaching the device to a wall, e.g. a backside of a kitchen wall adjacent a range. There is an open area 25 for receiving the other components, including the ceramic lining 30 when used with the invention, the intumescents 40 or 40A, the sheet metal comb 50, and the plastic liner 60. Box 20 includes side walls 26 and 28 and back wall 29. The box 20 is closed by sheet metal comb catch 70.

Figure 5:
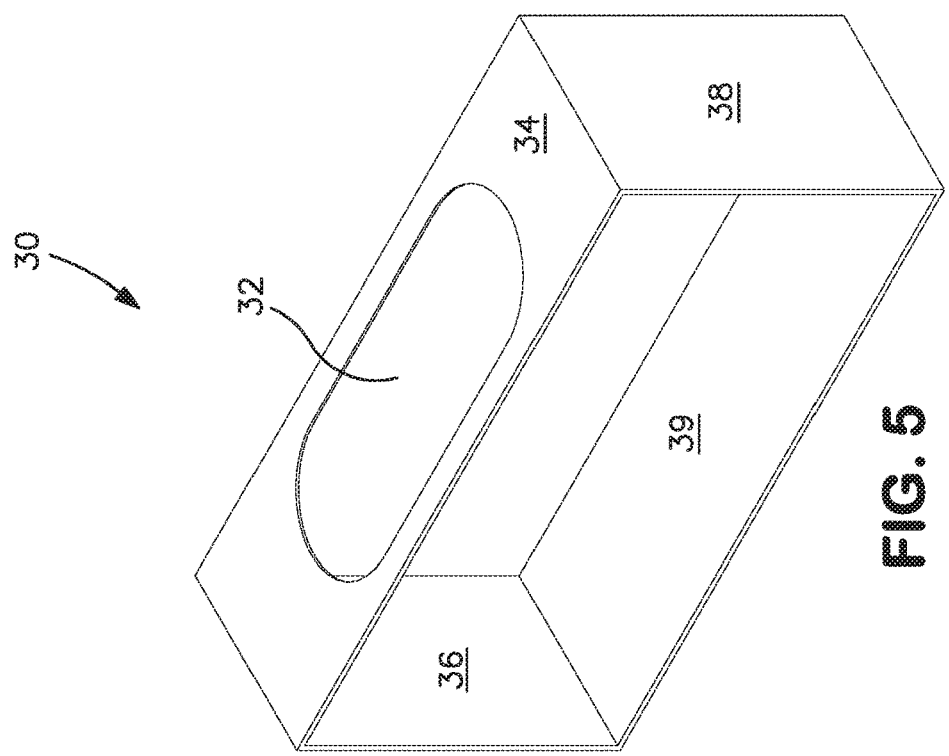
FIG. 5 is an enlarged view of the ceramic sheet lining shown in FIG. 2.

Referring to FIGS. 2 and 5, the ceramic lining 30 includes an open area 32 for mating with the male sleeve 90 and top wall 34, side walls 36 and 38, and bottom wall 39.

Figure 6A:
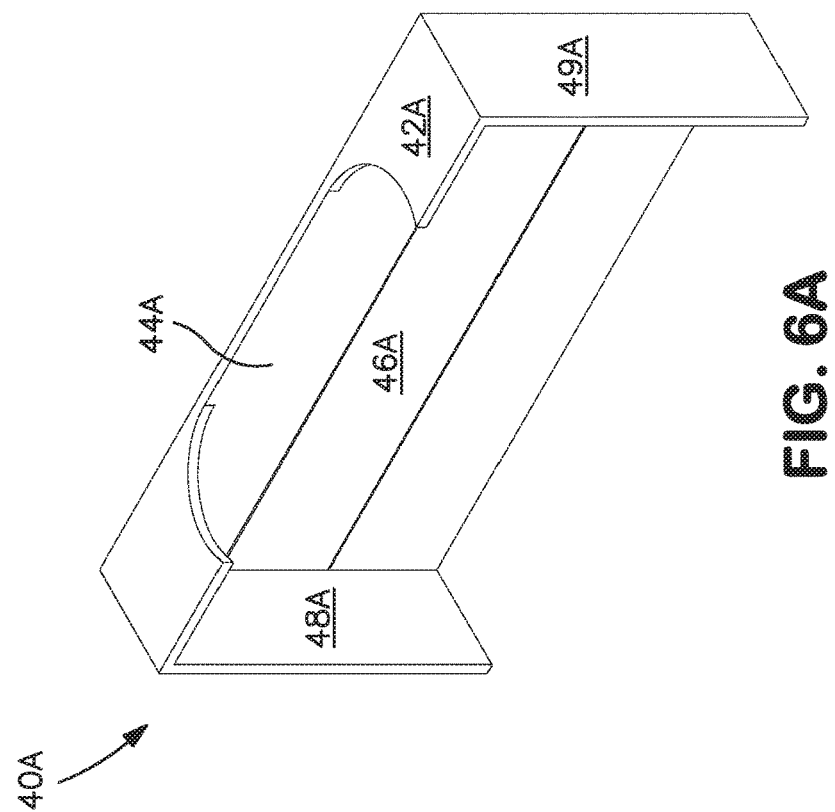
FIG. 6A is an enlarged view of the intumescent shown in FIG. 3.
Figure 6:
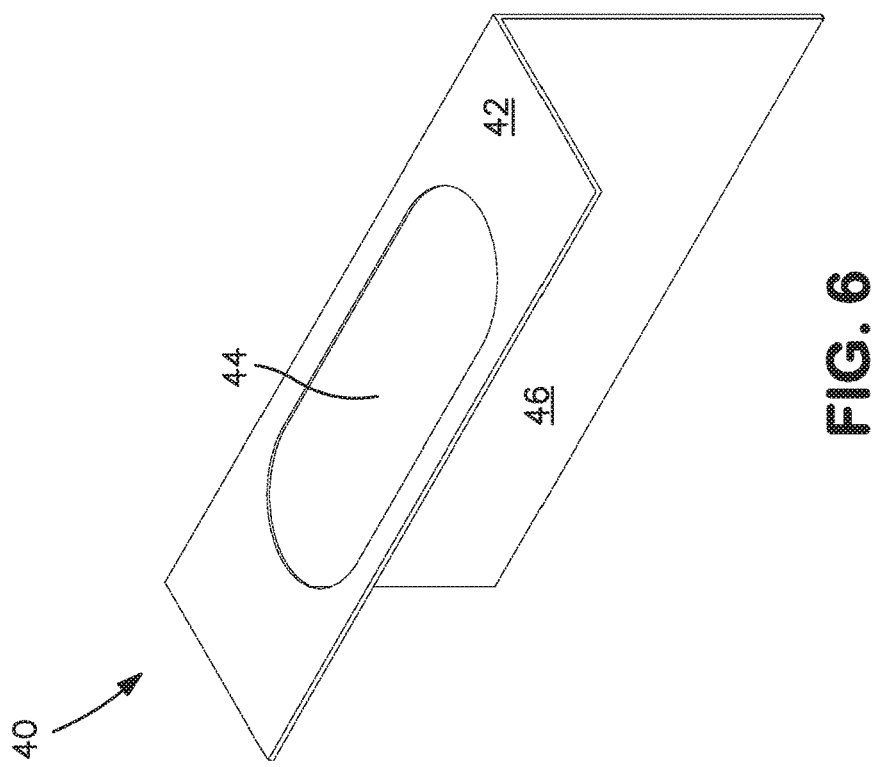
FIG. 6 is an enlarged view of the L-shaped intumescent shown in FIG. 2.

Referring to FIGS. 2 and 6, the intumescent 40 is preferably L-shaped and fits in the ceramic sheet lining 30. The L-shaped intumescent 40 includes a top wall 42 having an opening 44 for mating with the male sleeve 90 and a vertical wall 46 which fits adjacent the back wall 29 of metal box 20. The intumescent is designed when subjected to heat to expand to close off the fire damper in conjunction with the other components as discussed below.

Referring to FIGS. 3 and 6A, the intumescent 40A fits in the box 20 and is configured to mate with the box 20. The intumescent 40A includes a top wall 42A having an opening 44A for mating with the male sleeve 90 and a vertical back wall 46A which fits adjacent the back wall 29 of metal box 20 and side walls 48A and 49A. The intumescent is designed when subjected to heat to expand to close off the fire damper in conjunction with the other components as discussed below.

Referring to FIGS. 2, 3 and 7, there is a sheet metal comb 50. Sheet metal comb 50 fits adjacent and flush to the intumescents 40 or 40A. The sheet metal comb 50 includes a plurality of teeth 52 with fingers 54 and base 56. The sheet metal comb is designed to receive and contain the expanded intumescent material when subjected to heat and force the expanded intumescent material up sleeve 90. The expanded intumescent material closes off the spaces between the sheet metal comb teeth and the flow of air and contains a fire, i.e. prevents the fire from going up the sleeve 90 and the adjacent duct. Otherwise, in operation the sheet metal comb allows for the exhaust of smoke, fumes or the like from a kitchen range.

Referring to FIGS. 2, 3 and 8, the fire dampers 10 and 10A include a plastic liner 60 preferably made of polyethylene terephthalate (PET), high density polyethylene (HDPE) or other suitable plastics or other meltable materials such as, for example, a fusible alloy. The plastic material is selected to melt at a certain temperature depending on the fire damper's intended use to expose the intumescent materials 40 or 40A. The liner 60 may, in one preferred embodiment, be transparent. It also may include an opening 62 for the male sleeve 90. Liner 60 includes top wall 64, side walls 66 and 67, bottom 68 and back wall 69. Referring to FIG. 2, liner 60 fits in ceramic sheet lining 30, under L-shaped intumescent 40 and around comb 50. Referring to FIG. 3, liner 40A fits in box 20, under intumescent 40 and around comb 50.

Figure 9:
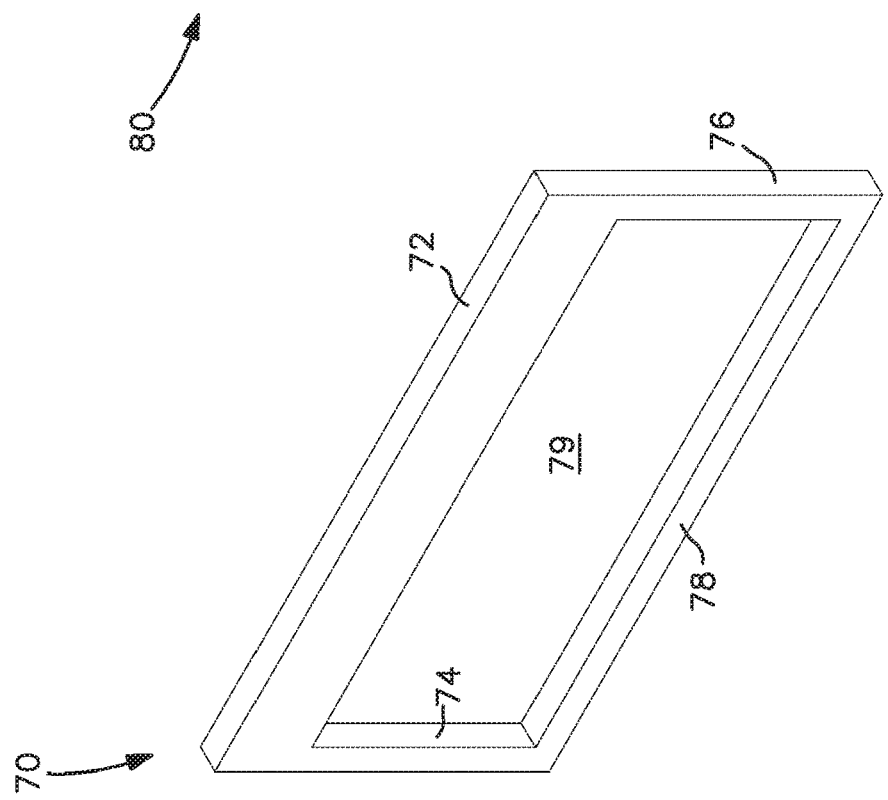
FIG. 9 is an enlarged view of a sheet metal comb catch shown in FIGS. 2 and 3.
Figure 11:
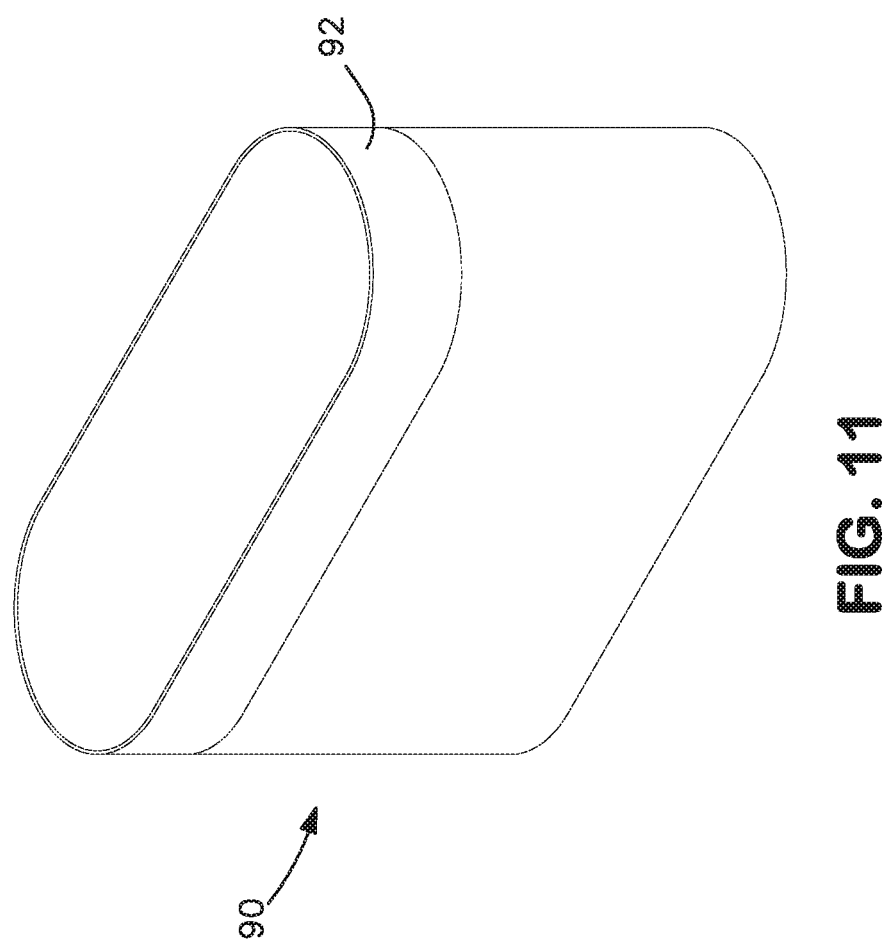
FIG. 11 is an enlarged view of the sheet metal sleeve shown in FIGS. 2 and 3.

Referring to FIGS. 2, 3 and 9, the invention further includes a sheet metal comb catch 70 having a top wall 72, side walls 74 and 76, and bottom wall 78, and having an opening 79. The sheet metal comb catch is connected to the sheet metal box 20. The sheet metal comb catch will enclose the sheet metal box 20 assembly components and will contain the sheet metal comb teeth as they expand outward by the intumescent, thereby containing the intumescent and forcing the expanded intumescent up sleeve 90.

Figure 10:
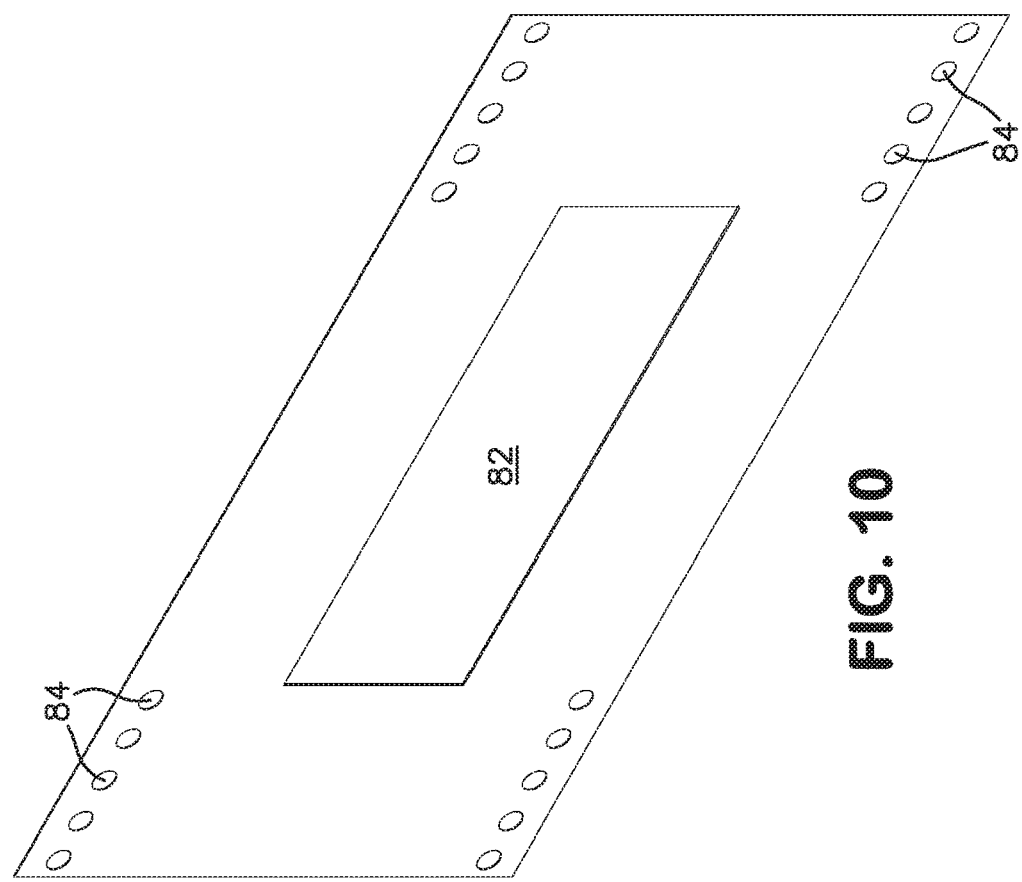
FIG. 10 is an enlarged view of the sheet metal escutcheon shown in FIGS. 2 and 3.

Referring to FIGS. 2, 3 and 10, there is a sheet metal escutcheon 80 which fits adjacent to a wall, e.g. a kitchen wall adjacent a kitchen range, and covers the fire damper assembly as previously described. The escutcheon 80 is rectangular and has an opening 82. It is understood that opening 82 may include an air flow material in the opening such as a screen. The escutcheon 80 further includes a plurality of apertures 84 in each of the four corners of the device which allows connection of the escutcheon to a wall behind the range by fasteners. The escutcheon also functions as a barrier to flame as well as keeps the intumescent better contained in the box. The escutcheon is also adjustable up and down and right and left when installing in the field to accommodate mistakes in placement during rough-in construction.

The fire damper 10 or 10A is connected to a sheet metal male sleeve 90 which fits in opening 22 of box 20. Upper end 92 is connected to a duct (not shown). In the alternative to using sheet metal sleeve 90, a further passive intumescent fire damper could be used such as disclosed in applicant's application Ser. No. 15/160,267, filed May 20, 2016, entitled "Passive Ductwork Intumescent Fire Damper." FIGS. 14 and 15 illustrate the passive intumescent fire damper 100 which includes a housing of a male metal duct member 112 and a female metal duct member 114; an inner liner 116 with ribs 116A; a metal and intumescent laminate assembly 118; an intumescent band 120; heat shrink bands 122 and 124; and clips 126. The housing shown for purposes of illustration is round but may be oval to fit into opening 22 of box 20.

Figure 12:
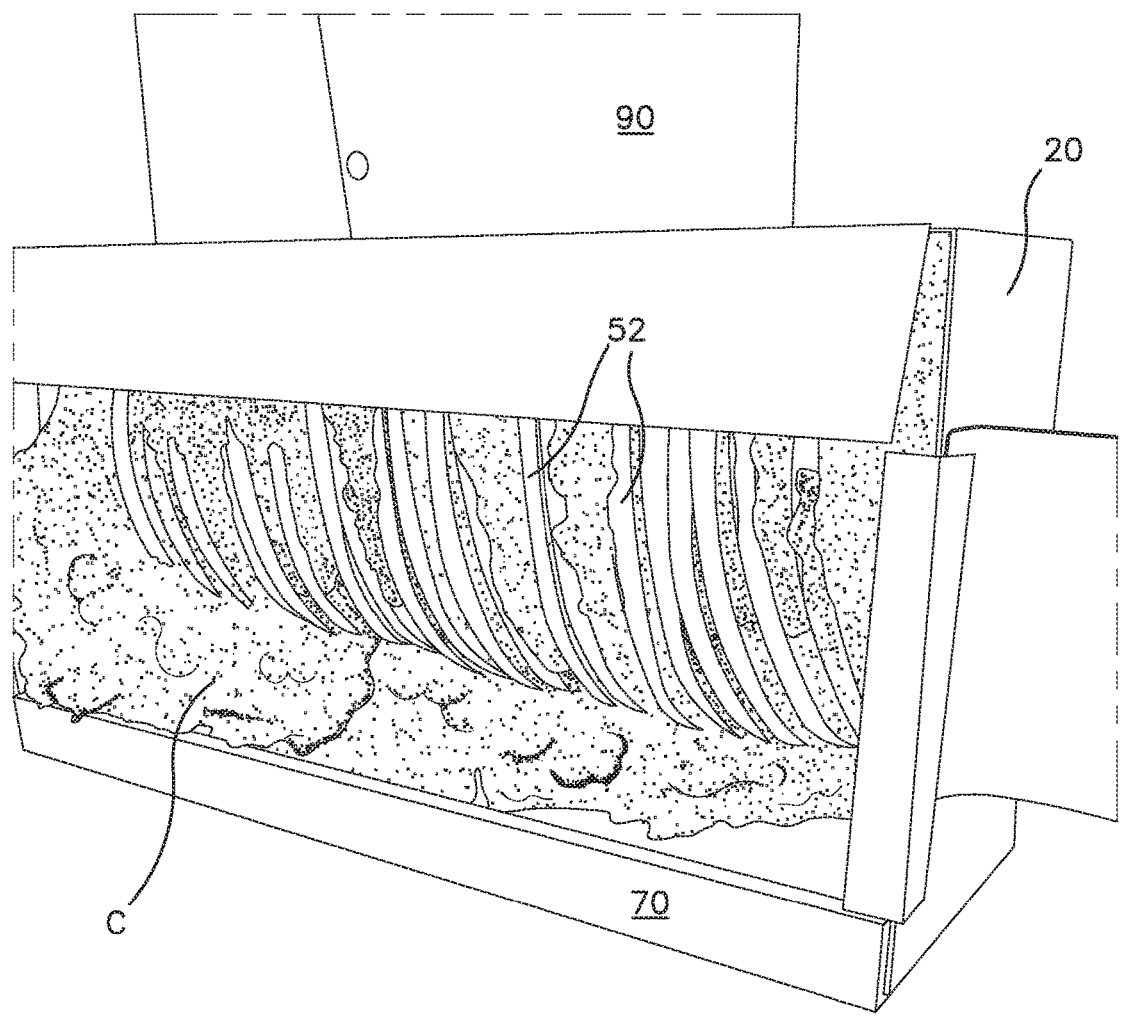
FIG. 12 is a front view of the invention of FIG. 1 after being subjected to fire.
Figure 13:
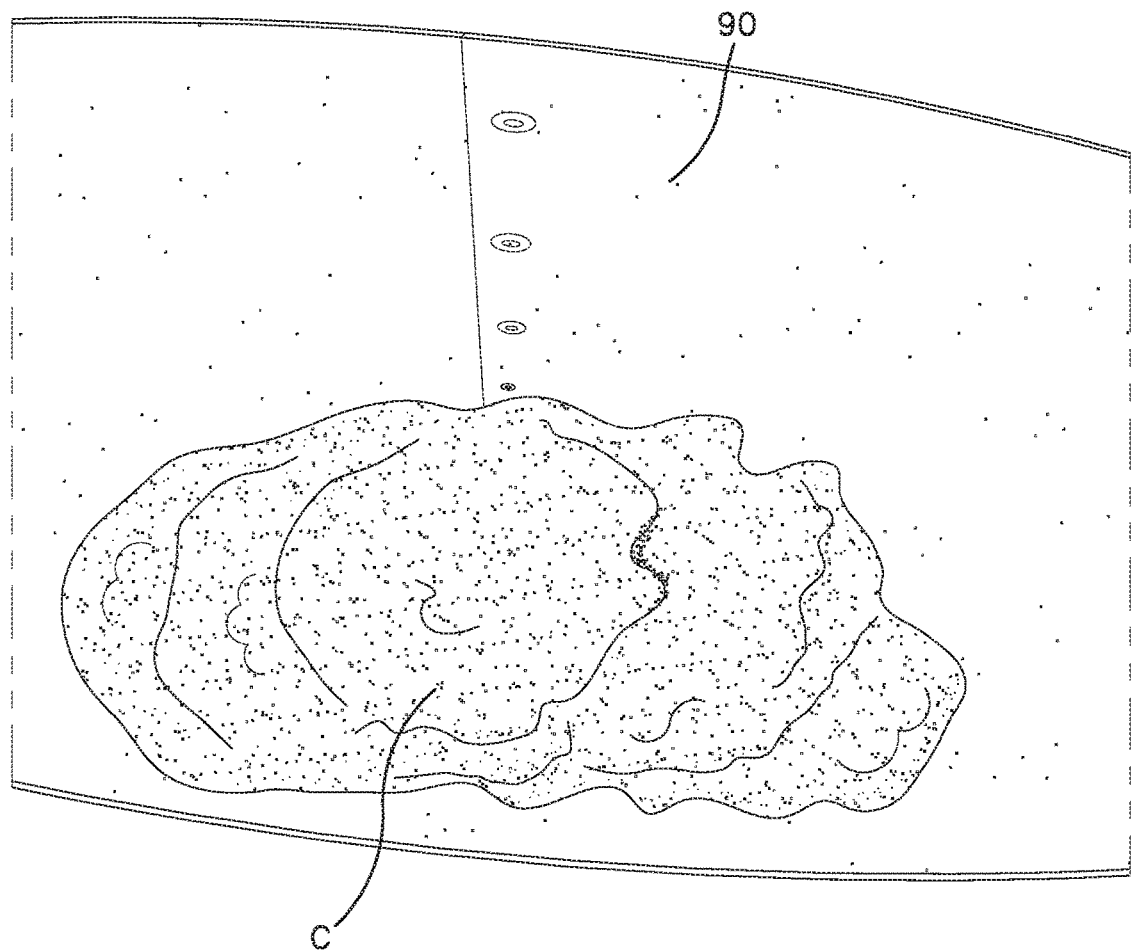
FIG. 13 is a top view of the invention of FIG. 1 looking into the sheet metal sleeve after being subjected to fire.

Referring to FIGS. 12 and 13, there is shown the fire damper 10 or 10A after being exposed to a fire. FIG. 12 shows the fire damper from the front which faced the heat source. The intumescent char C expands outwardly and is contained by teeth 52 which expand outwardly. Teeth 52 are contained by catch 70, thereby forcing intumescent char C into sleeve 90. FIG. 13 shows the fire damper from the top looking down into metal sleeve 90 and away from the heat source. These Figures show the intumescent char C as expanded and the closing off of the air stream and preventing the spread of the fire.

The present invention is simple in structure and use; is less expensive to manufacture than the more complex devices on the market; is useful in smaller horizontal applications such as venting of a kitchen range and similar ductwork or venting. The simple structure allows for ease of installation and use.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A passive intumescent fire damper for closing off an air stream in the event of a fire comprising a sheet metal box comprising a bottom wall, a top wall, a back wall and side walls and an assembly adapted to fit into said sheet metal box comprising an intumescent comprising a back wall and a top wall wherein said back wall is adapted to fit adjacent to said back wall of said sheet metal box, a sheet metal comb comprising a base and a plurality of teeth extending upwardly from said base wherein said base is adapted to fit adjacent to said bottom wall of said sheet metal box, and a plastic liner having a top wall, a bottom wall and side walls and adapted to surround said sheet metal comb and said top wall of said plastic liner is adapted to seat adjacent to said top wall of said intumescent.

2. The passive intumescent fire damper of claim 1 further comprising a sheet metal comb catch as part of said assembly.

3. The passive intumescent fire damper of claim 2 further comprising a sheet metal escutcheon as part of said assembly.

4. The passive intumescent fire damper of claim 1 wherein said sheet metal box is rectangular.

5. The passive intumescent fire damper of claim 1 wherein said plurality of teeth each include a finger.

6. The passive intumescent fire damper of claim 1 wherein said plastic liner is selected from the group consisting of polyethylene terephthalate, high density polyethylene and a fusible link.

7. The passive intumescent fire damper of claim 1 wherein said intumescent is L-shaped.

8. The passive intumescent fire damper of claim 1 wherein said intumescent further comprises said top wall having an opening and side walls.

9. The passive intumescent fire damper of claim 1 wherein said fire damper further includes a sheet metal sleeve adapted to fit into an opening in the top of said sheet metal box.

10. The passive intumescent fire damper of claim 1 further comprising a ceramic sheet lining as part of said assembly.

11. The passive intumescent fire damper of claim 1 wherein said fire damper further includes a passive intumescent fire damper adapted to fit into an opening in the top of said sheet metal box.

12. A passive intumescent fire damper for closing off an air stream in the event of a fire comprising a rectangular sheet metal box comprising a bottom wall, a top wall, a back wall and side walls and an assembly adapted to fit into said rectangular sheet metal box comprising an intumescent comprising a back wall and a top wall wherein said back wall is adapted to fit adjacent to said back wall of said sheet metal box, a sheet metal comb comprising a base and a plurality of teeth extending upwardly from said base wherein said base is adapted to fit adjacent to said bottom wall of said sheet metal box, a plastic liner having a top wall, a bottom wall and side walls and adapted to surround said sheet metal comb and said top wall of said plastic liner is adapted to seat adjacent to said top wall of said intumescent, a sheet metal catch adapted to fit adjacent to said sheet metal comb and a sheet metal escutcheon adapted to fit adjacent to said sheet metal catch, wherein when said fire damper is subjected to a fire or heat said plastic liner will melt and said intumescent when subjected to a predetermined temperature will expand and is contained by said sheet metal comb and said assembly will close off the flow of air through said fire damper.

13. The passive intumescent fire damper of claim 12 wherein said plurality of teeth each include a finger.

14. The passive intumescent fire damper of claim 12 wherein said plastic liner is selected from the group consisting of polyethylene terephthalate, high density polyethylene and a fusible link.

15. The passive intumescent fire damper of claim 12 further comprising a ceramic sheet lining as part of said assembly.

* * * * *